May 30, 1944.    K. W. WESTLUND    2,349,922
PRESSURE REGULATOR
Filed July 1, 1940
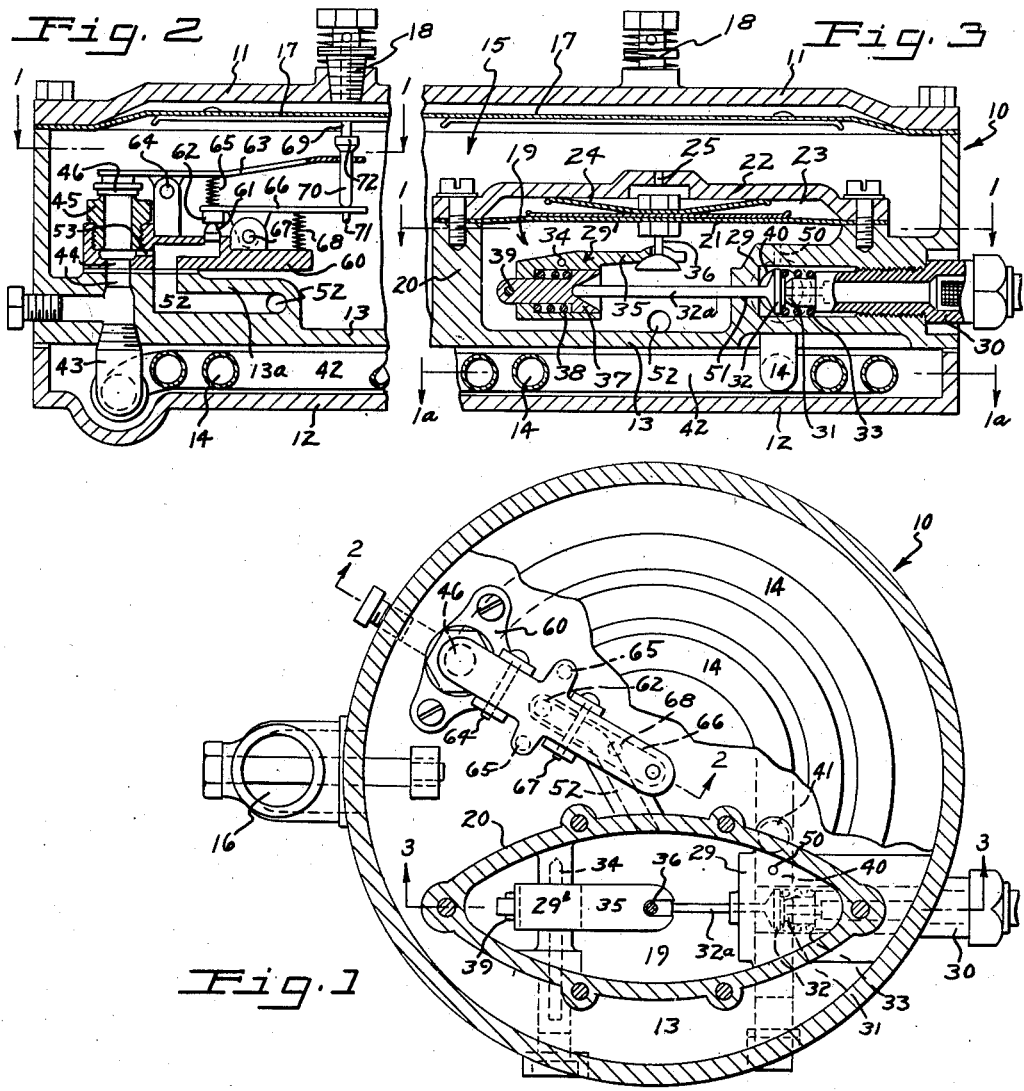
Inventor
Karl W. Westlund
Attys.

Patented May 30, 1944

2,349,922

UNITED STATES PATENT OFFICE 2,349,922

PRESSURE REGULATOR

Karl W. Westlund, Huntington Park, Calif., assignor to Ensign Carburetor Co., Ltd., Huntington Park, Calif., a corporation of California Application July 1, 1940, Serial No. 343,443

14 Claims. (Cl. 50—10)

My invention relates to pressure regulators of the multiple-stage type, the general object of the invention being to provide such a regulator with improved means for increasing its effective volumetric range of operation and its speed of response to variations of outlet pressure. These general objectives, and others, and the general characteristics of my improvements will be understood from the following general discussion and the succeeding detailed description of a specific illustrative embodiment of the invention.

Multiple-stage pressure regulators in which the pressure controlled output of one regulator unit is fed into the inlet of a successive unit, are typified in two-stage regulators such as I use here for descriptive purposes. Commonly such a regulator comprises a first stage regulator unit and a second stage regulator unit, each unit including a pressure control valve and a movable pressure-actuated valve-operating element which is usually a diaphragm. That element may be any pressure actuated means (such for instance as a piston) but for simplicity I shall use the term diaphragm to indicate any such element.

The initial high fluid pressure is fed to the inlet side of the high pressure first stage valve which, upon opening, feeds fluid into an intermediate pressure passage which leads to the inlet side of the low pressure second stage valve. Fluid at intermediate pressure is applied to the first stage diaphragm to move it in a direction to close the high pressure first stage valve, which it does when the intermediate pressure reaches the point determined by the reference pressure which is applied to that diaphragm tending to open the valve. At low or constant operating speeds the intermediate pressure is thus maintained substantially constant, if the effect of variations of the initial high pressure on the high pressure valve be disregarded or eliminated by using a balanced valve.

Any such regulator has certain inherent functional shortcomings, among which are (a) a lag in initial response and in response to variations of the delivery pressure due to variations of the demand on the delivery, and (b) a lowering of the delivery pressure as the volumetric speed of operation increases. Various arrangements have been made to overcome these deficiencies more or less effectively and to give such a regulator a wide range of operating capacity. One such arrangement is shown in the Ensign Patent 2,248,-222 where the intermediate pressure is raised, as the low pressure falls and velocities increase, by picking up a part of the velocity head from the stream flowing into the low pressure chamber and applying that head as a reference pressure to the first stage diaphragm.

My invention, however, modifies the action of the first stage unit and the effective intermediate pressure which it delivers, by controllably varying the actuating pressure which is effective on the first stage diaphragm to close the first stage valve; lowering that effective valve-closing pressure as the operating velocities increase and consequently raising the intermediate pressure which is delivered to the second stage regulator unit. This control operation, as will be explained, is of such a nature that the response to changing outlet pressures is much accelerated. These and other characteristics of my invention are explained in the following detailed description of an illustrative embodiment of the invention, reference for that purpose being had to the accompanying drawing in which Fig. 1 is a plan section, taken partially on lines 1—1 of Figs. 2 and 3, and partially on line 1a—1a of Fig. 3;

Fig. 2 is a fragmentary section taken on line 2—2 of Fig. 1; and

Fig. 3 is a fragmentary section taken on line 3—3 of Fig. 1.

In the drawing a suitable housing is shown at 10 provided with a cover 11 on one face, and provided at the other face with a member 12 which, together with housing wall 13, forms a water jacket surrounding a heating coil 14. Although my invention is not limited to regulators in which the fluid is heated at intermediate pressure, my invention has peculiar utilities as applied to a regulator structure in which the intermediate pressure passage is rather long or in which there is a pressure drop, and that is usually true in regulators which provide arrangements for heating the fluid at intermediate pressure.

In the regulator design as here illustrated, the major part of the enclosure of casing 10 forms a low pressure chamber 15 which has a final low pressure outlet at the fitting 16. One side of this low pressure chamber is formed by the low pressure or second stage diaphragm 17 which, in this particular illustration, is subjected on its outer surface to atmospheric pressure as a reference pressure. The apertured plug shown at 18 provides communication to atmosphere. Any other reference pressure, such as spring pressure, may be applied; and if it is desired to modify the reference pressure to suit different operating conditions, the opening into which plug 18 is screwed may be used for the connection of a tube which, for instance, goes to the intake of a gas engine. My invention is applicable and useful, regardless of the nature of the second stage reference pressure.

Within the interior of the main casing an intermediate pressure diaphragm chamber 19 is formed by the wall 20, the casing wall 13, and the first-stage diaphragm 21 which is secured to wall 20 under a cover 22. In this particular illustration, the first stage diaphragm chamber 19 is below diaphragm 21, and cover 22 forms a first stage reference pressure chamber 23 above diaphragm 21. In the illustrative design which is here shown, the first stage diaphragm is acted upon by a reference pressure which includes as one factor the low pressure from low pressure chamber 15, admitted to chamber 23 through aperture 25 in cover 22. As will be explained, the first stage valve opens whenever the diaphragm actuating pressure in chamber 19 is less than the total reference pressure on the diaphragm. Diaphragm spring 24 (as also valve spring 33, referred to later) adds a certain fixed amount of reference pressure to the reference pressure which is obtained from the low pressure chamber. Consequently the first stage valve will open whenever pressure in chamber 19 falls below a figure which depends upon the low pressure existing at the instant.

That arrangement is a desirable one in that it tends to keep the intermediate pressure normally at a certain fixed value above the low pressure at which the regulator delivers, and in that adjustable change of the low pressure by changing the second stage reference pressure is automatically followed by a corresponding change in the normal intermediate pressure. However, such an arrangement in multi-stage regulators has the disadvantage that when the low pressure falls during operation of the regulator, the first-stage diaphragm tends to close the first-stage valve and to lower the intermediate pressure rather than to raise it. It is one of the features inherent in my invention that its mode of operation overcomes that particular disadvantageous characteristic.

As shown in the drawing, the initial high pressure inlet is through the nipple shown at 30, the inner end of this nipple carrying the valve seat 31 upon which the first stage valve 32 seats against the opening pressure of valve spring 33. The first stage valve 31 is mounted on valve stem 32a which projects through a wall 29 into first stage diaphragm chamber 19. The end of valve stem 32a is connected with first stage diaphragm 21 preferably in the manner shown in Fig. 2. A lever member 29' is pivoted at 34 and has an arm 35 connected with a stud 36 mounted on first stage diaphragm 21. Member 29' carries a plunger 37 normally pressed forward by a spring 38 to a position which is limited by stop pin 39. The end of valve rod 32a seats in a depression in the outer end of plunger 37. Spring 38, prestressed by the setting of pin 39, is stronger than valve opening spring 33, so that in the normal operation of the regulator spring 38 is not compressed. But if at any time an excessive valve closing pressure should occur in diaphragm chamber 19 (due for instance to leakage past valve 32) the compression of spring 38 will limit the closing pressure which can be placed on valve 32 and thus protect that valve from injury by excessive pressure. It also allows diaphragm 21 to move back against cover 22 for support against high pressure.

Wall 29 forms a part of the enclosure of diaphragm chamber 19 and also encloses a passage 40 which forms a part of the intermediate pressure passage leading from valve 31 to the second stage valve. As here illustrated, the passage 40 communicates, via a passage 41, with the inlet end of the heater coil 14 which is located in the water jacketing or heating chamber enclosed by member 12. Any suitable means (not shown) of passing hot water or other heating agent through the chamber may be used. The outlet end of heating coil 42 connects with a fitting 43 which in turn connects with passage 44 leading to the valve seat 45 of the second stage or low pressure valve 46. In my invention, this valve becomes what I refer to as the main low pressure or second stage valve. The passages 40, 41, coil 14, and passages 43 and 44 may be broadly considered as the intermediate pressure passage leading from the first stage or high pressure valve to the second stage or low pressure valve. As shown, and particularly when such a passage includes a heating coil, it is rather long. And in such a long passage, and particularly one in which the fluids are being heated and expanded, the effective intermediate pressure available at the low stage valve drops off very rapidly as the volumetric speed of the regulator increases. My invention has peculiar adaptability, although not limitedly, to regulators which include such a long intermediate pressure passage.

In accordance with my invention, I primarily provide such a regulator as has here been typically described, or any multiple stage regulator, with a means for restrictedly feeding the intermediate pressure into the first stage diaphragm chamber 19, and then provide means, actuated by virtue of the pressure in low pressure chamber 15 (or the outlet pressure of the regulator) to bleed off and lower the first stage actuating pressure in diaphragm chamber 19 as the low pressure or outlet pressure drops. These provisions illustratively, but not limitedly, take such forms as I will now describe and which also include other features and functions as I will point out.

As shown in the drawing a restricted orifice 50 leads through wall 29 from passage 40 into diaphragm chamber 19. Looseness around valve stem 32a at 51 where it passes through wall 29 may also constitute a restricted connection between 40 and 19. Either or both of these restricted communications may be regarded as a restricted communication from the intake end of the intermediate pressure passage to diaphragm chamber 19.

A passage 52, preferably relatively large and unrestricted, leads from diaphragm chamber 19 to a point preferably adjacent the intermediate pressure passage 44 (see Fig. 2). Passage 52 is controlled by an auxiliary or pilot valve 62 which will presently be described. Another restricted orifice 53 communicates between intermediate pressure passage 44 and the passage 52, as shown in Fig. 2; orifice 53 being located in such positional relation to passage 44 that, at certain phases of operation it will be subject to the velocity caused depression existing in passage 44 when the velocity there is relatively high. This action will be referred to later. The primary function of orifice 53 is to establish a restricted communication between the delivery end of the intermediate pressure passage and the passage 53 and diaphragm chamber 19. It is convenient that passages 44 and 52 be mutually adjacent, to facilitate the assembly of valves 46 and 62 into a compact valve organization and to facilitate the placement of restricted orifice 53.

As illustrated in the drawing a valve seat unit 60 is secured on the enlargement or boss 13a of wall 13. Passages 52 and 44 pass through this boss, and the upper parts of those passages are located in the unit 60 in register with the passages in the boss. The valve seat unit carries the main valve seat 45 and also carries an auxiliary valve seat 61 which is closed by auxiliary valve 62. The main valve 46 is mounted on a valve lever 63 which is pivoted on seat unit 60 at 64, a spring or pair of springs 65 tending to close the main valve against the intermediate pressure. Auxiliary valve 62 is mounted on a valve lever 66 pivoted on unit 60 at 67 and is closed by spring 68 against the intermediate pressure. A stem 69 is affixed to second-stage diaphragm 17 and moves with it. This stem has a relatively large portion 70 which passes freely through the end of main valve lever 63 and, in the non-operating position of the parts with all the valves closed, just rests at its lower end upon the end of auxiliary valve lever 66. A small pin 71 at the end of larger part 70 may pass through lever 66 to form a guide. In the position which has been referred to and shown in Fig. 2, an enlargement or collar 72 at the upper end of part 70 of pin 69 is located a short distance above main valve lever 63. The arrangement is such that as diaphragm 17 moves down to open the second stage valves, auxiliary valve lever 66 is first pushed down to lift auxiliary valve 62 off its seat, and then enlargement 72 contacts main valve lever 63 to open the main valve.

Assuming that the low pressure outlet at 16 is closed (or that the pressure in low pressure chamber 15 is higher than that at which the regulator is set to deliver) the full intermediate pressure for which first stage diaphragm 21 is set will be standing in diaphragm chamber 19, also in the whole length of the intermediate pressure passage from first stage valve 32 to second stage valve 46, and also in passage 52 between first stage diaphragm chamber 19 and auxiliary valve 62. Fluid will be standing in low pressure chamber 15 at substantially the low pressure at which the second stage diaphragm 17 is set to close the second stage valves. In this description that pressure is assumed to be approximately atmospheric, but it may be any suitable or desired pressure.

As soon as pressure in low pressure chamber 15 is lowered, as by starting an engine to which the outlet of the regulator is connected, low pressure diaphragm 17 moves first to open pilot valve 62. As soon as that valve is opened the immediate effect is to reduce the pressure in passage 52 and in first stage diaphragm chamber 19. This immediate reduction of pressure in chamber 19 causes first stage valve 32 to open to increase the pressure in the intermediate pressure passage leading from first stage valve 32 to second stage valve 46 and to restricted orifice 53. Fluid at the increased intermediate pressure tends immediately to enter first stage diaphragm chamber 19 through the restricted orifice 50 and through the restricted orifice 53 and passage 52. But both these orifices being restricted, and valve 62 being open, the pressure in passage 52 and in diaphragm chamber 19 is maintained somewhat lower than it is in the intermediate pressure passage which leads directly from first stage valve 32 to second stage valve 46 and the orifice 53. And consequently, pressure in the intermediate pressure passage is maintained higher than it normally would be. These described conditions are maintained, in spite of the fact that the orifice through auxiliary valve seat 61 may be also relatively small. The valve seat orifice passes fluid under a pressure differential which is measured by the difference between the low delivery pressure and the modified intermediate pressure existing in the first stage diaphragm chamber. Passage 52 being preferably relatively wide open and unrestricted, the reduction of pressure effected by discharge through the auxiliary valve is immediately transmitted to the first-stage diaphragm chamber 19. On the other hand, the restricted orifices at 50 and 53 are only passing fluid under a pressure differential which is measured by the amount by which the pressure in 52 and 19 is lowered below that in the intermediate pressure passage leading from valve 32 to valve 46. Thus, a relatively small pilot valve will effectively and quickly lower the pressure to a substantial degree in that chamber. And that is true even if the part of passage 52 lying between valve seat 61 and orifice 53 is relatively restricted—any restriction at that point may be regarded simply as restriction in or at the valve seat. The use of a small pilot valve is particularly desirable as it requires only a light spring and will open on a very slight drop of the outlet pressure. Further discussion of the relative sizes of the passages and orifices is given later.

For small volumetric requirements, as for feeding an idling engine, the regulator may supply the required volume of gas with only pilot valve 62 open. In that type of operation as well as in initial opening the two restricted orifices 50 and 53 may be regarded as performing essentially the same function; that of restrictedly feeding intermediate pressure into the first stage diaphragm chamber 19 and to the pilot valve. With the fluid moving slowly through the main intermediate pressure passage 40, 14, 43, 44, the pressures in that passage at the orifices 50 and 53 may be regarded as substantially equal.

Passage 52 and the pilot valve are therefore restrictedly fed by both orifices 50 and 53; the pressure in passage 52 and diaphragm chamber 19 being lowered to a point somewhat under the normal or standing intermediate pressure, and valve 32 being consequently opened to increase the intermediate pressure in the intermediate pressure passage until balance is attained. This build-up of the intermediate pressure, on initial opening of the pilot valve, not only accelerates the response of the regulator to initial opening and facilitates delivery at low volume, but also gives a preliminary build up of the intermediate pressure in anticipation of the opening of the main second stage valve. That anticipatory increase of the intermediate pressure acting on the lower face of the main valve makes that valve open more easily against the spring pressure which only has to hold the valve closed against the normal or standing pressure.

When pressure in low pressure chamber 15 is further reduced by increased requirements on the regulator, low pressure diaphragm 17 moves further to open main valve 46. Fluid then begins moving through the main intermediate pressure passage at higher velocity and discharges into the low pressure chamber via main valve 46 in addition to discharge through the pilot valve.

At such higher velocities, the pressure at the discharge end of the intermediate pressure passage, near valve 46 and orifice 53, becomes less than it is at the head end of that passage at first stage valve 32 and at restricted orifice 50. The pressure at the discharge end of the passage, at restricted orifice 53, may become low enough that fluid flow through orifice 53 will be relatively reversed, so that fluid flows from passage 52 via orifice 53 into the main intermediate pressure passage 44. Thus, in relatively wide open operation of the regulator, both the flow through pilot valve 61 (which is still open or even opened more widely), and also the increased velocity of gas flow in main passage 44 past orifice 53, may both have the effect of directly lowering the pressure in passage 52 and in first stage diaphragm chamber 19, and of consequently boosting the pressure in the main intermediate pressure passage. The restricted orifice 53, placed as it is, thus has the additional function of aiding the pilot valve in the control of the corrective pressure in first stage diaphragm chamber 19. And further, with the two restricted orifices 50 and 53 connecting diaphragm chamber 19 with both the head end and the discharge end of the long intermediate pressure passage, surges in that long passage and resultant chattering operation of the regulator are avoided. This provision is thought to be of some importance in a regulator where the fuel is heated and vaporized in a heating passage located between the two restricted orifices.

The general function of the valve controlled passage 52 leading from first stage diaphragm chamber 19 to the low pressure chamber 15 is thus not only to obtain a quick initial build-up of intermediate pressure in the main intermediate passage when the regulator first opens, but also thereafter to maintain a higher pressure in the main intermediate pressure passage than would normally be maintained. As the main valve opens wider in response to greater demand the pilot valve lifts further off its seat and may thus open more widely to increase the resulting pressure drop in the first stage diaphragm chamber, and thus to further increase the build-up of the intermediate pressure. Thus the pilot valve may have not only the function of initially building up the pressure and maintaining the build-up, but also the function of further increasing the pressure build-up as the main valve opens wider. This not only results in quick build-up of pressure on initial opening but also results in faster response to varying demands and in a much greater operating range for any given sized regulator, due to the fact that the effective intermediate pressure, in the intermediate pressure passage, may be built up to pressure substantially above normal when the regulator is operating at high velocities. And, as remarked before, the peculiar placement of restricted orifice 53 also has similar functions when the regulator is operating at high velocities.

There are several distinct phases of operation of the regulator. In the low demand phase when only the pilot valve 62 is open, the regulator operates just as if main valve 46 were nonexistent—that is, just as if the second stage valve means included only the one valve instead of two, and that one valve controlled the passage 52 which leads from and controls the pressure in first stage diaphragm chamber 19, that chamber and the passage 52 being restrictedly fed from the main intermediate pressure passage. And what has just been said is the same as saying that, in the low demand phase, both the outlet 52 from the restrictedly fed diaphragm chamber 19, and the main intermediate pressure passage 40—44, via restricted orifice 53, lead to one and the same valve 62.

In the high demand phase of operation, with both valves 46 and 62 open, the action of auxiliary valve 62, controlling the discharge from diaphragm chamber 19 and thus controlling the boosting of the intermediate pressure, still continues (and may be supplemented by the described action of orifice 53). But the action of auxiliary valve 62 at that time does not depend upon its having opened first. So, again in this phase of operation, the two valves may be considered as one.

But the preliminary opening of pilot valve 62—its opening ahead of the opening of main valve 46—builds up the intermediate pressure to feed main valve 46 ahead of rather than lagging behind the opening of that valve. In this phase of the operation the sequentially opening valve means, or a multiple valve, is important.

It may also be remarked that certain functions of my improved regulator do not require all of the apparatus elements which have been described. For instance, it will be remembered that in the initial opening phase and in the phase of low operation with only the auxiliary valve open, orifice 52 performs the same function as orifice 50. In those phases of operation both orifices merely restrictively feed intermediate pressure to the first stage diaphragm chamber and to the auxiliary valve. Consequently one or the other orifice can be dispensed with. And in the high demand phase of operation the same is true. For instance the auxiliary valve can be used exclusively to control the modified pressure in the diaphragm chamber, without being aided by the action of orifice 52. Thus, although the action of that orifice is desirable in the latter operational phase, it is not indispensible.

Considering only the action of the auxiliary valve for controlling the diaphragm chamber pressure, it is only necessary that there be some restricted admission of intermediate pressure to the diaphragm chamber and that the auxiliary valve control the bleeding off of that pressure. For that purpose it is not necessary, although preferable, that the bleeding off passage 52 be relatively unrestricted. The whole passage, including the valve, might be substantially as small as the pressure inlet passage, but with the valve wide open the pressure in the diaphragm chamber would be reduced to half the pressure in the intermediate passage (speaking of a final delivery at atmospheric pressure, and of pressures above atmosphere). If passage 52 is made relatively wide open the modification range of pressure in the diaphragm chamber, and therefore the range of pressure increase in the intermediate pressure passage is increased. The wide open passage is consequently preferable for that reason; and is also preferable in connection with the functions of orifice 53 in reducing the pressure in the diaphragm chamber when that orifice is in the position shown. With that orifice communicating with passage 52 near the auxiliary valve it is desirable that passage 52 be open from the orifice to the diaphragm chamber.

The main advantages of my improved regulator reside in its quick response and wide range of volumetric capacity, and in other features which I have pointed out. There are also other inherent or incidental advantages, among which I may mention that, for any given capacity, a smaller regulator and, particularly, smaller valves than usual may be used—which are desirable because of the smaller pressures necessary to close them and because of the lesser effects which are had on the regulator by variations in the initial high pressure. And another feature is that an engine, for instance, may be properly fed for both idling and normal operation through a single connection with the regulator.

I claim as my invention:

1. In a two-stage fluid pressure regulator having a high pressure inlet, a first stage regulator means, including a valve and a valve operating diaphragm, for reducing the high inlet pressure to an intermediate pressure, an intermediate pressure passage, a diaphragm chamber located on that side of the diaphragm where pressure on it tends to close the valve, a low pressure chamber, and a second stage regulator actuated by pressure in the low pressure chamber and including a valvular means which controllably admits fluid from the intermediate pressure passage to the low pressure chamber; the combination of means forming a restricted communication from the intermediate pressure passage to the first stage diaphragm chamber to restrictedly apply intermediate pressure thereto, and a passage leading from the first stage diaphragm chamber to the valvular means of the second stage regulator so that said valvular means admits fluid directly from the first stage diaphragm chamber to the low pressure chamber.

2. In a two-stage fluid pressure regulator having a high pressure inlet, a first stage regulator means, including a valve and a valve operating diaphragm, for reducing the high inlet pressure to an intermediate pressure, an intermediate pressure passage, a diaphragm chamber located on that side of the diaphragm where pressure on it tends to close the valve, a low pressure chamber, and a second stage regulator actuated by pressure in the low pressure chamber and including a valvular means which controllably admits fluid from the intermediate pressure passage to the low pressure chamber; the combination of means forming a restricted communication from the intermedaite pressure passage to the first stage diaphragm chamber to restrictedly apply intermediate pressure thereto, and a passage leading from the first stage diaphragm chamber to the valvular means of the second stage regulator so that said valvular means admits fluid directly from the first stage diaphragm chamber to the low pressure chamber, the valvular means of the second stage regulator comprising two separate valves which respectively control the intermediate pressure passage and the relatively unrestricted passage leading from the diaphragm chamber.

3. In a two-stage fluid pressure regulator having a high pressure inlet, a first stage regulator means, including a valve and a valve operating diaphragm, for reducing the high inlet pressure to an intermediate pressure, an intermediate pressure passage, a diaphragm chamber located on that side of the diaphragm where pressure on it tends to close the valve, a low pressure chamber, and a second stage regulator actuated by pressure in the low pressure chamber and including a valvular means which controllably admits fluid from the intermediate pressure passage to the low pressure chamber; the combination of means forming a restricted communication from the intermediate pressure passage to the first stage diaphragm chamber to restrictedly apply intermediate pressure thereto, and a passage leading from the first stage diaphragm chamber to the valvular means of the second stage regulator so that said valvular means admits fluid directly from the first stage diaphragm chamber to the low pressure chamber, the valvular means of the second stage regulator being adapted to open the relatively unrestricted passage to the low pressure chamber before opening the intermediate pressure passage to that chamber.

4. In a two-stage fluid pressure regulator having a high pressure inlet, a first stage regulator means, including a valve and a valve operating diaphragm, for reducing the high inlet pressure to an intermediate pressure, an intermediate pressure passage, a diaphragm chamber located on that side of the diaphragm where pressure on it tends to close the valve, a low pressure chamber, and a second stage regulator including a diaphragm actuated by pressure in the low pressure chamber and valvular means which controllably admits fluid from the intermediate pressure passage of the low pressure chamber; the combination of means forming a restricted communication from the intermediate pressure passage to the first stage diaphragm chamber to restrictedly apply intermediate pressure thereto, and a passage leading from the first stage diaphragm chamber to the valvular means of the second stage regulator so that said valvular means admits fluid directly from the first stage diaphragm chamber to the low pressure chamber, the valvular means of the second stage regulator comprising two separate valves which respectively control the intermediate pressure passage and the relatively unrestricted passage leading from the first stage diaphragm chamber, and actuating connection between the two said valves and the second stage regulator diaphragm such that the second mentioned one of said valves is opened before the other said valve as the pressure in the low pressure chamber decreases.

5. In a two-stage fluid pressure regulator having a high pressure inlet, a first stage regulator means, including a valve and a valve operating diaphragm, for reducing the high inlet pressure to an intermediate pressure, an intermediate pressure passage, a diaphragm chamber located on that side of the diaphragm where pressure on it tends to close the valve, a low pressure chamber, and a second stage regulator actuated by pressure in the low pressure chamber and including a valvular means which controllably admits fluid from the intermediate pressure passage to the low pressure chamber, the first stage regulator means having means for applying pressure from the low pressure chamber to said first stage diaphragm as a reference pressure on that side where pressure on it tends to open the first stage valve; the combination of means forming a restricted communication from the intermediate pressure passage to the first stage diaphragm chamber to restrictedly apply intermediate pressure thereto, and a passage leading from the first stage diaphragm chamber to the valvular means of the second stage regulator so that said valvular means admits fluid directly from the first stage diaphragm chamber to the low pressure chamber.

6. In a two-stage fluid pressure regulator having a high pressure inlet, a first stage regulator means, including a valve and a valve operating diaphragm, for reducing the high inlet pressure to an intermediate pressure, an intermediate pressure passage, a diaphragm chamber located on that side of the diaphragm where pressure on it tends to close the valve, a low pressure chamber, and a second stage regulator actuated by pressure in the low pressure chamber and including a valvular means which controllably admits fluid from the intermediate pressure passage to the low pressure chamber, the first stage regulator means having means for applying pressure from the low pressure chamber to said first stage diaphragm as a reference pressure on that side where pressure on it tends to open the first stage valve; the combination of means forming a restricted communication from the intermediate pressure passage to the first stage diaphragm chamber to restrictedly apply intermediate pressure thereto, and a passage leading from the first stage diaphragm chamber to the valvular means of the second stage regulator so that said valvular means admits fluid directly from the first stage diaphragm chamber to the low pressure chamber, the valvular means of the second stage regulator comprising two separate valves which respectively control the intermediate pressure passage and the relatively unrestricted passage leading from the diaphragm chamber.

7. In a two-stage fluid pressure regulator having a high pressure inlet, a first stage regulator means, including a valve and a valve operating diaphragm, for reducing the high inlet pressure to an intermediate pressure, an intermediate pressure passage, a diaphragm chamber located on that side of the diaphragm where pressure on it tends to close the valve, a low pressure chamber, and a second stage regulator actuated by pressure in the low pressure chamber and including a valvular means which controllably admits fluid from the intermediate pressure passage to the low pressure chamber, the first stage regulator means having means for applying pressure from the low pressure chamber to said first stage diaphragm as a reference pressure on that side where pressure on it tends to open the first stage valve, the combination of means forming a restricted communication from the intermediate pressure passage to the first stage diaphragm chamber to restrictedly apply intermediate pressure thereto, and a passage leading from the first stage diaphragm chamber to the valvular means of the second stage regulator so that said valvular means admits fluid directly from the first stage diaphragm chamber to the low pressure chamber, the valvular means of the second stage regulator being adapted to open the relatively unrestricted passage to the low pressure chamber before opening the intermediate pressure passage to that chamber.

8. In a two-stage fluid pressure regulator having a high pressure inlet, a first stage regulator means, including a valve and a valve operating diaphragm, for reducing the high inlet pressure to an intermediate pressure, an intermediate pressure passage, a diaphragm chamber located on that side of the diaphragm where pressure on it tends to close the valve, a low pressure chamber, and a second stage regulator including a diaphragm actuated by pressure in the low pressure chamber and valvular means which controllably admits fluid from the intermediate pressure passage to the low pressure chamber, the first stage regulator means having means for applying pressure from the low pressure chamber to said first stage diaphragm as a reference pressure on that side where pressure on it tends to open the first stage valve; the combination of means forming a restricted communication from the intermediate pressure passage to the first stage diaphragm chamber to restrictedly apply intermediate pressure thereto, and a passage leading from the first stage diaphragm chamber to the valvular means of the second stage regulator so that said valvular means admits fluid directly from the first stage diaphragm chamber to the low pressure chamber, the valvular means of the second stage regulator comprising two separate valves which respectively control the intermediate pressure passage and the relatively unrestricted passage leading from the first stage diaphragm chamber, and actuating connection between the two said valves and the second stage regulator diaphragm such that the second mentioned one of said valves is opened before the other said valve as the pressure in the low pressure chamber decreases.

9. Fluid pressure regulator as specified in claim 1, and in which the means forming a restricted communication between the intermediate pressure passage and the first stage diaphragm chamber includes a restricted orifice which communicates with the intermediate pressure passage at a point in that passage adjacent the second stage regulator valve, so that the pressure at said orifice is modified by the pressure drop which is due to the velocity of fluid flow through the intermediate pressure passage.

10. Fluid pressure regulator as specified in claim 1, and in which the means forming a restricted communication between the intermediate pressure passage and the first stage diaphragm chamber includes two restricted orifices, one communicating with the intermediate pressure passage at a point adjacent the first stage regulator valve and the other communicating with that passage at a point adjacent the second stage regulator valve.

11. Fluid pressure regulator as specified in claim 3, and in which the means forming a restricted communication between the intermediate pressure passage and the first stage diaphragm chamber includes a restricted orifice which communicates with the intermediate pressure passage at a point in that passage adjacent the second stage regulator valve, so that the pressure at said orifice is modified by the pressure drop which is due to the velocity of fluid flow through the intermediate pressure passage.

12. Fluid pressure regulator as specified in claim 3, and in which the means forming a restricted communication between the intermediate pressure passage and the first stage diaphragm chamber includes two restricted orifices, one communicating with the intermediate pressure passage at a point adjacent the first stage regulator valve and the other communicating with that passage at a point adjacent the second stage regulator valve.

13. Fluid pressure regulator as specified in claim 1, and in which the means forming a restricted communication between the intermediate pressure passage and the first stage diaphragm chamber includes a restricted orifice which communicates with the intermediate pressure passage in such orientation as to pick up the pressure drop which is due to flow velocity through the intermediate pressure passage, whereby the pressure which is restrictedly applied to said diaphragm chamber is modified by the velocity of flow through the intermediate pressure passage.

14. Fluid pressure regulator as specified in claim 3, and in which the means forming a restricted communication between the intermediate pressure passage and the first stage diaphragm chamber includes a restricted orifice which communicates with the intermediate pressure passage in such orientation as to pick up the pressure drop which is due to flow velocity through the intermediate pressure passage, whereby the pressure which is restrictedly applied to said diaphragm chamber is modified by the velocity of flow through the intermediate pressure passage.

KARL W. WESTLUND.